(12) United States Patent
Benderius

(10) Patent No.: US 11,272,184 B2
(45) Date of Patent: Mar. 8, 2022

(54) ENCODING OF A VIDEO SEQUENCE

(71) Applicant: Axis AB, Lund (SE)

(72) Inventor: Björn Benderius, Lund (SE)

(73) Assignee: AXIS AB, Lund (SE)

(*) Notice: Subject to any disclaimer, the term of this patent is extended or adjusted under 35 U.S.C. 154(b) by 0 days.

(21) Appl. No.: 17/069,913

(22) Filed: Oct. 14, 2020

(65) Prior Publication Data

US 2021/0168371 A1 Jun. 3, 2021

(30) Foreign Application Priority Data

Dec. 3, 2019 (EP) .................................. 19213243

(51) Int. Cl.
*H04N 19/137* (2014.01)
*H04N 19/167* (2014.01)
*H04N 19/172* (2014.01)
*H04N 19/503* (2014.01)
*H04N 19/86* (2014.01)

(52) U.S. Cl.
CPC ......... *H04N 19/137* (2014.11); *H04N 19/167* (2014.11); *H04N 19/172* (2014.11); *H04N 19/503* (2014.11); *H04N 19/86* (2014.11)

(58) Field of Classification Search
CPC ......... H04N 7/18; H04N 19/00; H04N 19/137
See application file for complete search history.

(56) References Cited

U.S. PATENT DOCUMENTS 9,479,786 B2 * 10/2016 Lu ..................... H04N 19/147
2003/0161407 A1 8/2003 Murdock et al.
2005/0220189 A1 * 10/2005 Brooks ............... H04N 19/139
375/240.15
2006/0192693 A1 8/2006 Yamauchi
2007/0248332 A1 10/2007 Yata et al.
2010/0277586 A1 11/2010 Ying et al.
(Continued)

FOREIGN PATENT DOCUMENTS

EP 0722250 A2 7/1996
EP 1503596 A2 2/2005
(Continued)

OTHER PUBLICATIONS

Stankiewicz et al., "Temporal noise reduction for preprocessing of video streams in monitoring systems" (2000).
(Continued)

*Primary Examiner* — Kyle M Lotfi
(74) *Attorney, Agent, or Firm* — Volpe Koenig

(57) ABSTRACT

Systems and methods are disclosed for inter-coding of a video. To inter-code a frame relative to a previous frame of the video, techniques disclosed include partitioning the frame and the previous frame into corresponding portions. Then, for each portion of the frame, a difference between the frame's portion and its corresponding portion in the previous frame is determined. A probability for suppressing the determined difference is further devised as a function of the difference. A decision whether to suppress the difference is then made based on the probability. If a decision to suppress has been made, the difference between the frame portion and the corresponding portion in the previous frame is suppressed before the frame portion is inter-encoded relative to the corresponding portion in the previous frame.

15 Claims, 3 Drawing Sheets

(56) References Cited

U.S. PATENT DOCUMENTS

2015/0016510 A1* 1/2015 Carlsson .............. H04N 19/167
　　　　　　　　　　　　　　　　　　375/240.03
2020/0036973 A1　1/2020 Kanoh et al.

FOREIGN PATENT DOCUMENTS

| EP | 1845731 A1 | 10/2007 |
| EP | 3046072 A1 | 7/2016 |
| EP | 3379830 A1 | 9/2018 |
| JP | 2000-023166 A | 1/2000 |
| JP | 2006-157267 A | 6/2006 |
| WO | 2006/025396 A1 | 3/2006 |
| WO | 2007/139391 A1 | 12/2007 |
| WO | 2009/123248 A1 | 10/2009 |
| WO | 2018/017866 A1 | 1/2018 |
| WO | 2018/186431 A1 | 10/2018 |

OTHER PUBLICATIONS

Extended European Search Report dated Jan. 28, 2020 for European Patent Application No. 19213243.9.
Nordic Patent Institute, Novelty Search (Oct. 25, 2019).

* cited by examiner

ENCODING OF A VIDEO SEQUENCE

TECHNICAL FIELD

The present invention relates to encoding of a video sequence. Especially, inter-coding a second video frame of a video sequence in relation to a first video frame of the video sequence.

BACKGROUND

When encoding a video sequence, it is differences between video frames that are expensive to encode. For a video sequence of a scene, pixel values will differ between each frame. Sometimes the difference is desired, i.e. when there are actual events in the scene, but sometimes the difference is undesired, e.g. due to sensor noise or small changes of light levels in the scene. The latter is especially true for monitoring applications in which the number of events is limited. For the undesired changes an approach to use in order to reduce the cost for encoding is to suppress the differences by setting a threshold value suppressing differences below the threshold. However, doing so will lead to structured artifacts. Human vision is very sensitive to structured artifacts, so the threshold would have to be quite small to avoid disturbing structured artifacts. Hence, there is a need to be able to reduce the cost for encoding a video sequence and at the same time avoid structured artifacts.

SUMMARY

Mitigating, alleviating or eliminating one or more of the above-identified deficiencies in the art and disadvantages singly or in any combination and at least partly solve the above-mentioned problem would be beneficial.

According to a first aspect, a method of inter-coding a second video frame of a video sequence in relation to a first video frame is provided. The method comprises dividing the first and second video frames into frame portions. The method further comprises, for each frame portion of the second video frame: determining a difference between video data of the frame portion of the second video frame and video data of a corresponding frame portion of the first video frame; determining a probability for suppressing the difference, wherein the probability is determined according to a probability function that decreases with an increasing size of the difference; deciding whether to suppress the difference or not based on the determined probability; suppressing the difference in case it is decided to suppress the difference; and inter-encoding the frame portion of the second video frame in relation to the first video frame.

In this context "suppressing" refers to that a difference between video data of the frame portion of the second video frame and video data of a corresponding frame portion of the first video frame should not be considered as a difference between the video data.

The present method facilitates reduction of cost for encoding the video sequence while avoiding structured artifacts. This since the suppression is made with a probability that is inversely proportional to the magnitude of the difference. Hence, for a region within a video sequence wherein suppression of differences is made not the whole region will be suppressed. Accordingly, the artifacts induced by the suppression may not end up being structured.

Suppressing the difference for a frame portion of the second video frame may comprise setting video data of the frame portion of the second video frame to be equal to video data of the corresponding frame portion of the first video frame. Hence, the functionality of the suppressing may be made during image processing of the video sequence before the encoding. Accordingly, the functionality of the suppressing may be made without modifications of the encoder.

Suppressing the difference for a frame portion of the second video frame may comprise ignoring the difference while inter-encoding the frame portion of the second video frame. By adding the functionally of the suppressing to the encoding may provide a less complicated implementation of a video processing pipeline configured to perform the method.

It may also be noted that the resulting video quality/bitrate will most probably be unaffected regardless of if the suppressing is performed by setting video data of the frame portion of the second video frame to be equal to video data of the corresponding frame portion of the first video frame or by ignoring the difference while inter-encoding the frame portion of the second video frame.

Determining a difference between video data of a frame portion of the second video frame and video data of a corresponding frame portion of the first video frame may comprise determining a difference between pixel values of the frame portion of the second video frame and pixel values of the corresponding frame portion of the first video frame.

Determining a difference between video data of a frame portion of the second video frame and video data of a corresponding frame portion of the first video frame may comprise determining a difference between frequency coefficients of the frame portion of the second video frame and frequency coefficients of the corresponding frame portion of the first video frame. By using the difference between frequency coefficients, a distinction between differences between video frames induced by actual events in the scene and noise induced differences between video frames may be made. In the frequency domain differences between video frames induced by actual events and differences between video frames induced by noice is different. Further, the difference between frequency coefficients will give an indication regarding a cost of encoding the difference. Hence, giving a possibility to better optimize the encoding of the video sequence.

The probability function may be a continuous function. The probability function may give a probability between 0 and 1 for each value of a size of the difference between video data of a frame portion of the second video frame and video data of a corresponding frame portion of the first video frame.

The probability function may be a linear function.

The probability function may be a reverse sigmoid function.

The method may further comprise determining a region of interest in the second video frame. A probability function used for determining the probability for suppressing the difference for the frame portions within the region of interest may be different from a probability function used for determining the probability for suppressing the difference for the frame portions outside the region of interest. Hence, different reductions of cost for encoding the video sequence for different regions of the scene may be used. For an important region of the scene, a probability function giving relatively low probability for suppression may be used. For a non-interesting region of the scene, a probability function giving relatively high probability for suppression may be used.

The method may further comprise, for each frame portion of the second video frame, receiving information whether a difference between the corresponding frame portion of the first video frame and a corresponding frame portion of a video frame preceding the first video frame in the video sequence was suppressed. If the difference between the corresponding frame portion of the first video frame and the corresponding frame portion of the video frame preceding the first video frame was suppressed, the method may further comprise decreasing the probability for suppressing the difference of the frame portion of the second video frame. This approach allows for that a risk of that a certain frame portion never would get updated may be avoided. This since the probability for suppressing the difference of the frame portion may be (accumulatively) decreased as long as the frame portion has not been updated. The accumulated decrease in probability for suppression may be reset once an update of the frame portion has been made.

According to a second aspect a non-transitory computer-readable storage medium is provided. The non-transitory computer-readable storage medium having stored thereon instructions for implementing the method according to the first aspect, when executed on a device having processing capabilities.

The above-mentioned features of the first aspect, when applicable, apply to this second aspect as well. In order to avoid undue repetition, reference is made to the above.

According to a third aspect a video processing pipeline is provided. The video processing pipeline is configured to inter-coding a second video frame of a video sequence in relation to a first video frame. The video processing pipeline comprising: a video frame partitioning module configured to divide the first and second video frames into frame portions; a change module configured to, for each frame portion of the second video frame, determine a difference between video data of the frame portion of the second video frame and video data of a corresponding frame portion of the first video frame; a probability module configured to determine a probability for individually suppressing each of the determined differences, wherein the probability for individually suppressing each of the determined differences is determined according to a probability function that decreases with an increasing size of the difference; a suppress module configured to decide whether to suppress each of the determined difference or not based on a respective determined probability, and to suppress the difference in case it is decided to suppress the difference; and an encode module, arranged downstream the suppress module, wherein the encode module is configured to inter-encode the frame portions of the second video frame in relation to the first video frame.

In case it is decided to suppress the difference, the suppress module may be configured to suppress the difference by setting video data of the frame portion of the second video frame to be equal to the video data of the corresponding frame portion of the first video frame.

The suppress module may be configured to suppress the difference by instructing the encode module to ignore the difference while inter-encoding the frame portion of the second video frame.

The above-mentioned features of the first aspect, when applicable, apply to this third aspect as well. In order to avoid undue repetition, reference is made to the above.

According to a fourth aspect a video camera is provided. The video camera comprising the video processing pipeline of the third aspect.

The above-mentioned features of the first aspect, when applicable, apply to this fourth aspect as well. In order to avoid undue repetition, reference is made to the above.

A further scope of applicability will become apparent from the detailed description given below. However, it should be understood that the detailed description and specific examples, while indicating preferred embodiments, are given by way of illustration only, since various changes and modifications within the scope of the claims will become apparent to those skilled in the art from this detailed description.

Hence, it is to be understood that the embodiments are not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects will now be described in more detail, with reference to appended figures. The figures should not be considered limiting; instead they are used for explaining and understanding.

As illustrated in the figures, the sizes of layers and regions may be exaggerated for illustrative purposes and, thus, are provided to illustrate the general structures. Like reference numerals refer to like elements throughout.

DETAILED DESCRIPTION

The present teachings will now be described more fully hereinafter with reference to the accompanying drawings, in which currently preferred embodiments are shown. The embodiments may, however, be set forth in many different forms and should not be construed as limited to the embodiments set forth herein; rather, these embodiments are provided for thoroughness and completeness, and to fully convey the scope of the embodiments to the skilled person.

Figure 1:
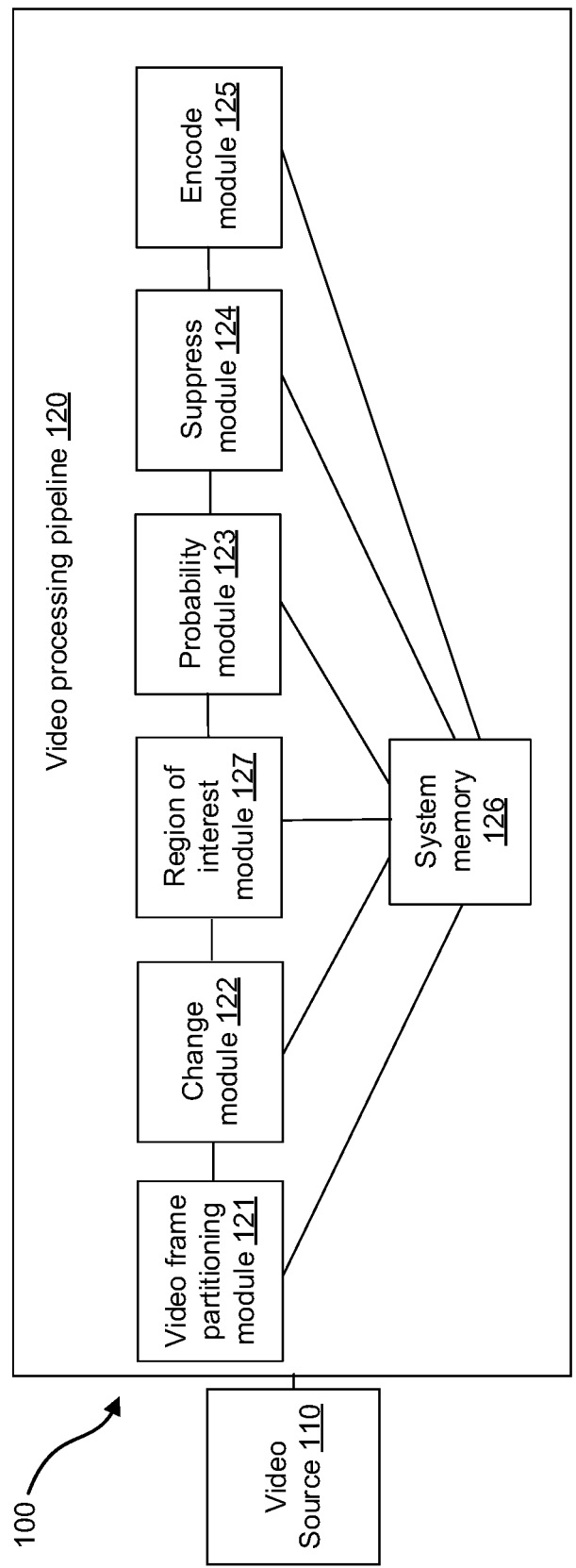
FIG. 1 schematically illustrates a video processing system.
Figure 2:
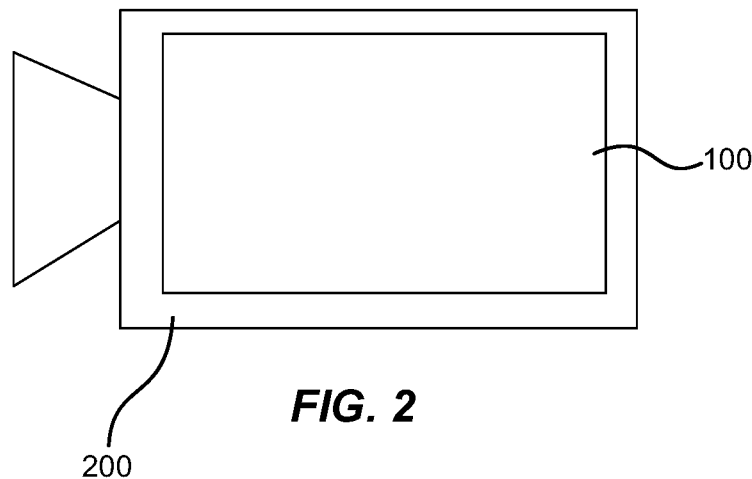
FIG. 2 schematically illustrates a camera comprising the video processing system of FIG. 1.

In connection with FIG. 1 a video image processing system 100 configured to generate and process video image data will be described. The video image processing system 100 comprises a video source 110 and a video processing pipeline 120. As illustrated in FIG. 2, the video image processing system 100 may be implemented in a video camera 200. The video camera 200 may be a digital video camera. The video camera 200 may be a monitoring camera.

The video source 110 is configured to capture video data. The video source 110 may be an image sensor. The image sensor is configured to capture the video data. The video source 110 is configured to transfer the captured video data to the video processing pipeline 120.

The video processing pipeline 120 is configured to process video data into video frames of a video sequence. The video data processed by the video processing pipeline 120 may be the video data captured by the video source 110. However, the video processing pipeline 120 may work independently of the video source 110. The video processing pipeline 120 may process any video data as long as the video data may be processed into video frames of a video sequence.

The video processing pipeline 120 comprises a plurality of processing modules 121, 122, 123, 124, 125. Each processing module 121, 122, 123, 124, 125 is configured to process the video data. Some of the plurality of processing modules 121, 122, 123, 124, 125 may be dependent on each other. Hence, they need to be executed one after another. Some of the plurality of processing modules 121, 122, 123, 124, 125 may be independent on each other. Hence, they may be executed in parallel.

A specific processing module of the video processing pipeline 120 may be implemented as a computer software portion run on a general-purpose processor or on a graphics processing unit, a field-programmable gate array, a fixed-function application-specific integrated circuit, or an analog circuit. Every one of the plurality of processing modules may be implemented using the same type of implementation. Different ones of the plurality of processing modules may be implemented using different implementations of the processing module. A subset of the plurality of processing modules may be implemented using the same type of implementation. Accordingly, a specific processing module of the video processing pipeline 120 may be implemented as software, dedicated hardware or firmware, or some combination of dedicated hardware, firmware and/or software.

The video processing pipeline 120 may further comprise a system memory 126. The system memory 126 may be used by a processing module of the video processing pipeline 126 while processing the video data. The system memory 126 may comprise a volatile memory, such as a random-access memory, RAM.

The video processing pipeline 120 comprises a video frame partitioning module 121, a change module 122, a probability module 123, a suppress module 124, and an encode module 125.

The video frame partitioning module 121 is configured to divide video frames of the video sequence into frame portions. Especially, the video frame partitioning module 121 is configured to divide a first and a second video frame of the video sequence into frame portion. The video processing pipeline 120 is configured to inter-encode the second video frame in in relation to the first video frame. Typically, each frame portion of a video frame of the video sequence is to be considered as a group of pixels belonging to an encoding unit of the video frame to which it belongs. In different encoding standards the encoding unit is called differently. For example, in H.264 the encoding unit is denoted a macroblock, in H.265 the encoding unit is denoted a coding tree unit. It is understood that any of these encoding units or any other encoding units may be used as the frame portions in the context of the present embodiments. Normally, the frame portions are non-overlapping.

The change module 122 is configured to, for each frame portion of the second video frame, determine a difference between video data of the frame portion of the second video frame and video data of a corresponding frame portion of the first video frame. The difference between video data of the frame portion of the second video frame and video data of the corresponding frame portion of the first video frame may be determined as a difference between pixel values of the frame portion of the second video frame and pixel values of the corresponding frame portion of the first video frame. The difference between pixel values may be one or more of: a sum of absolute pixel differences, a sum of squared pixel differences, a mean of the pixel differences, and a median of the pixel differences. Alternatively, or in combination, the difference between video data of the frame portion of the second video frame and video data of the corresponding frame portion of the first video frame may be determined as a difference between frequency coefficients of the frame portion (the frame portion being an encoding unit) of the second video frame and frequency coefficients of the corresponding frame portion (the frame portion being an encoding unit) of the first video frame. The difference between frequency coefficients may be one or more of: a sum of absolute differences of the frequency coefficients, a sum of weighted absolute differences of frequency coefficients, and a maximum absolute difference. The frequency coefficients may be obtained by performing a discrete cosine transform, a Fourier transform, or any other kind of transform, of the video data of the frame portion.

Figure 3:
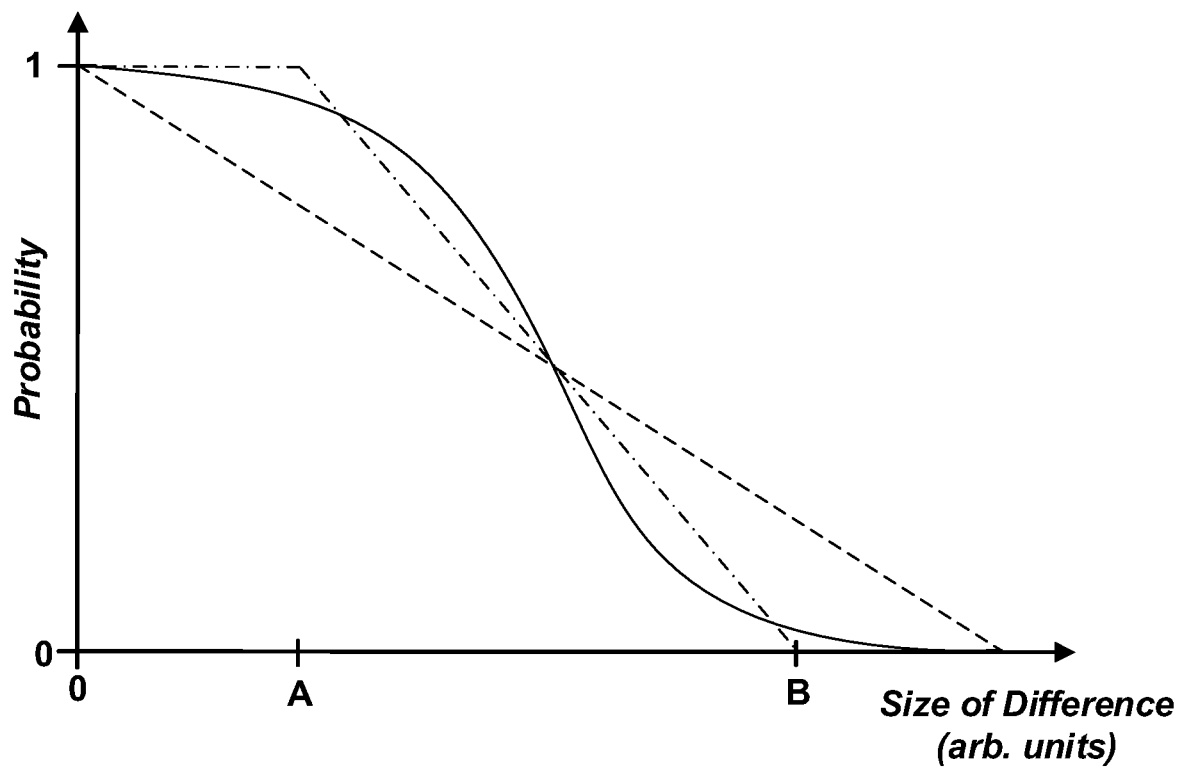
FIG. 3 illustrate different probability functions for suppressing a difference between a frame portion in a second video frame as compared with a corresponding frame portion of a first video frame.

The probability module 123 is configured to determine a probability for suppressing the difference between video data of the frame portion of the second video frame and video data of the corresponding frame portion of the first video frame. The probability for suppressing a difference between video data of a specific frame portion of the second video frame and video data of the corresponding specific frame portion of the first video frame is individually determined. Hence, the probability module 123 is configured to determine an individual probability for individually suppressing each of the determined differences. The probability module 123 is configured to determine the probability according to a probability function. The probability function is set to decrease with an increasing size of the difference. The probability function may e.g. give a probability between 0 and 1, wherein a probability of 0 denotes that the probability is 0% chance for performing the suppression, and wherein a probability of 1 denotes that the probability is 100% chance for performing the suppression. Various probability functions may be used. Preferably, the probability function is a continuous function. As illustrated as a dashed line or the dashed-dotted line in FIG. 3, the probability function may be a linear function. The dashed line indicates a probability function that is linear over the whole range of sizes of the difference. The dashed-dotted line indicates a probability function that is piecewise linear. The piecewise linear probability function may have an interval between 0 and A, in size of difference, where the probability for suppressing is 100% and for sizes of difference above B the probability for suppressing is 0%. Alternatively, as illustrated as a solid line in FIG. 3, the probability function may be a reverse sigmoid function.

Further, probability module 123 may be configured to receive information whether a difference between the corresponding frame portion of the first video frame and a corresponding frame portion of a video frame preceding the first video frame in the video sequence was suppressed. If the difference between the corresponding frame portion of the first video frame and the corresponding frame portion of the video frame preceding the first video frame was suppressed, the probability module 123 may be configured to decrease the probability for suppressing the difference of the frame portion of the second video frame. An amount of the decrease in the probability may be set in different ways. For example, the amount of the decrease in the probability may be predetermined, e.g. a 10% decrease in the probability. Alternatively, the amount of the decrease in the probability may depend on a difference between the corresponding frame portion of the first video frame and the corresponding frame portion of the video frame preceding the first video frame in the video sequence. For example, the amount of the decrease in the probability may increase with an increasing size of the difference between the frame portion of the first video frame and the corresponding frame portion of the video frame preceding the first video frame in the video sequence.

The suppress module 124 is configured to decide whether to suppress a difference between video data of the frame portion of the second video frame and video data of the corresponding frame portion of the first video frame or not. The decision is based on the respective determined individual probability for individually suppressing each of the determined differences. Typically, the decision is made by comparing the probability [between 0 and 1 in the example above] with a random number [between 0 and 1]. The probability for each determined difference is typically compared with a freshly generated random number. Hence, for each specific difference between video data of the frame portion of the second video frame and video data of the corresponding frame portion of the first video frame, a new random number is typically generated for comparison with the probability for that specific difference. In case it is decided to suppress the difference between video data of the frame portion of the second video frame and video data of the corresponding frame portion of the first video frame, the suppress module 124 is configured to suppress the difference.

The suppress module 124 may be configured to suppress the difference between video data of the frame portion of the second video frame and video data of the corresponding frame portion of the first video frame in different ways. The suppress module 124 may be configured to suppress the difference by setting video data of the frame portion of the second video frame to be equal to the video data of the corresponding frame portion of the first video frame. This may e.g. be made by copying video data of the first video frame to the second video frame. Especially, copying video data of the corresponding frame portion of the first video frame to the frame portion of the second video frame. Alternatively, or in combination, the suppress module 124 may be configured to suppress the difference by instructing the encode module 125 to ignore the difference between video data of the frame portion of the second video frame and video data of the corresponding frame portion of the first video frame while inter-encoding the frame portion of the second video frame. Ignoring the difference may e.g. be made by encoding the frame portion of the second video frame as a skip block.

The encode module 125 is configured to encode the video frames of the video sequence. The encode module 125 is configured to encode the video frames of the video sequence using any suitable video encoding method based on intra and inter encoding, such as H.263, H.264 or H.265. Hence, the encode module 125 is configured to encode some of the images of the video sequence as intra frames. An intra frame is an encoded video frame that does not require information from other encoded video frames to be decoded. Hence, an intra frame is encoded based on information from the image of the video data it is set to correspond to. Typically, similarities within the image is used to encode the image into an intra frame. In video encoding an intra frame is often referred to as an I-frame. The encode module 125 is further configured to encode the images of the video stream in between two intra frames as inter frames. Typically, an inter frame only comprises changes that occur from one frame to the next. Hence, inter frames are typically comprising less data than intra frames. In video encoding an inter frame is often referred to as a P-frame or a B-frame. P-frames refer to previous frames for data reference. Hence, the content of previous frames must be known in order to decode a P-frame. B-frames may refer to both previous and forward frames for data reference. Hence, the content of both the previous and forward frames must be known in order to decode a B-frame. Especially, the encode module 125 is configured to inter-encode the frame portions of the second video frame in relation to the first video frame. Hence, the frame portions of the second video frame are encoded as P or B frame portions where frame portions of the first video frame are used as reference. The encode module 125 is typically arranged downstream the suppress module 124 in the video processing pipeline 120.

The video processing pipeline 120 may further comprise a region of interest module 127. The region of interest module 127 is configured to determine a region of interest in the second video frame. The region of interest may be determined using one or more of: a motion detection algorithm, an object detection algorithm, user input, and a focus measure of portions of the second video frame.

The probability module 123 may be configured to use different probability functions for different frame portions. Especially, the probability module 123 may be configured to use a different probability function for determining the probability for suppressing the difference for frame portions of the second video frame being within the region of interest as compared with frame portions of the second video frame being outside the region of interest.

Figure 4:
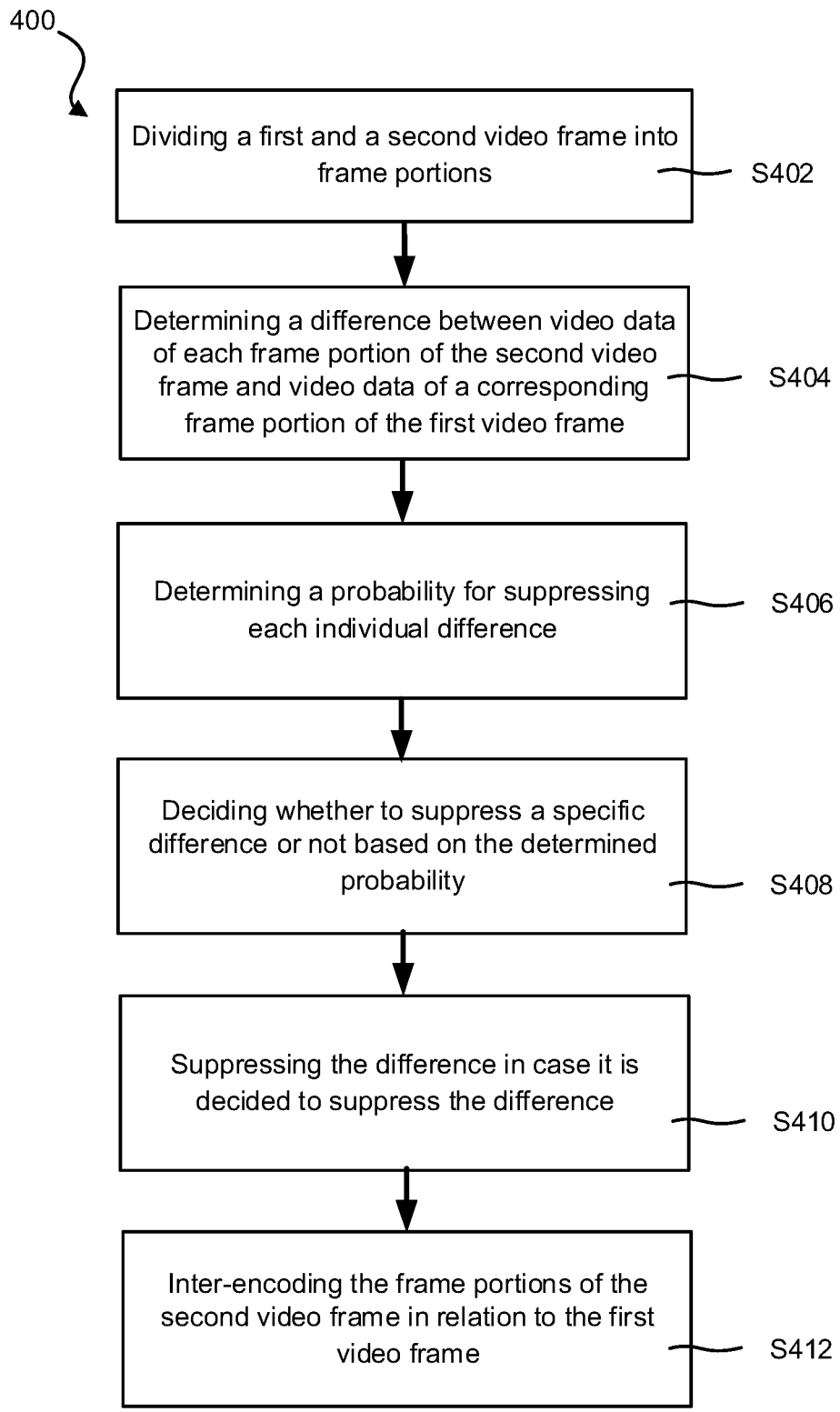
FIG. 4 is a block scheme of a method of inter-coding a second video frame of a video sequence in relation to a first video frame.

In connection with FIG. 4, a method 400 of inter-coding a second video frame of a video sequence in relation to a first video frame will be discussed. The method may be implemented as a computer implemented method. The method 400 comprises the following steps/acts. The steps/acts may be performed in any suitable order.

Dividing S402 the first and second video frames into frame portions. Typically, each frame portion of a video frame of the video sequence is to be considered as a group of pixels belonging to an encoding unit of the video frame it belongs to. In different encoding standards the encoding unit is called differently. For example, in H.264 the encoding unit is denoted a macroblock, in H.265 the encoding unit is denoted a coding tree unit. It is understood that any of these encoding units or any other encoding units may be used as the frame portions in the context of the present embodiments. Normally, the frame portions are non-overlapping.

Determining S404, for each frame portion of the second video frame, a difference between video data of the frame portion of the second video frame and video data of a corresponding frame portion of the first video frame. The difference between video data of the frame portion of the second video frame and video data of the corresponding frame portion of the first video frame may be determined as a difference between pixel values of the frame portion of the second video frame and pixel values of the corresponding frame portion of the first video frame. The difference between pixel values may be one or more of: a sum of absolute pixel differences, a sum of squared pixel differences, a mean of the pixel differences, and a median of the pixel differences. Alternatively, or in combination, the difference between video data of the frame portion of the second video frame and video data of the corresponding frame portion of the first video frame may be determined as a difference between frequency coefficients of the frame portion (the frame portion being an encoding unit) of the second video frame and frequency coefficients of the corresponding frame portion (the frame portion being an encoding unit) of the first video frame. The difference between frequency coefficients may be one or more of: a sum of absolute differences of the frequency coefficients, a sum of weighted absolute differences of frequency coefficients, and a maximum absolute difference.

Determining S406, for each difference between video data of the frame portion of the second video frame and video data of the corresponding frame portion of the first video frame, a probability for suppressing the difference. Hence, an individual probability for individually suppressing each of the determined differences is determined. Each probability is determined according to a probability function. The probability function decreases with an increasing size of the difference. Preferably, the probability function is a continuous function. As illustrated in connection with FIG. 3, examples of probability functions are a linear function (dashed line in FIG. 3) or a reverse sigmoid function (solid line in FIG. 3).

Deciding S408 whether to suppress a specific difference, between video data of the frame portion of the second video frame and video data of the corresponding frame portion of the first video frame, or not. The deciding S408 is based on the in step S406 determined individual probability for the specific difference. Typically, the decision is made by comparing the individual probability with a random number. The probability for each specific difference is typically compared with a freshly generated random number. Hence, for each specific difference a new random number is typically generated for comparison with the probability for that specific difference.

In case it is decided to suppress a specific difference between video data of a frame portion of the second video frame and video data of the corresponding frame portion of the first video frame, suppressing S410 the specific difference. Suppressing S410 of a specific difference for a frame portion of the second video frame may comprise setting video data of the frame portion of the second video frame to be equal to video data of the corresponding frame portion of the first video frame. This may e.g. be made by copying video data of the first video frame to the second video frame. Especially, copying video data of the corresponding frame portion of the first video frame to the frame portion of the second video frame. Alternatively, or in combination, suppressing S410 a specific difference for a frame portion of the second video frame may comprises ignoring the difference between video data of the frame portion of the second video frame and video data of the corresponding frame portion of the first video frame while inter-encoding, see step S412, the frame portion of the second video frame. Ignoring the difference may e.g. be made by encoding the frame portion of the second video frame as a skip block.

After or while suppressing S410 a difference between video data of a frame portion of the second video frame and video data of a corresponding frame portions of the first video frame, inter-encoding S412 the frame portion of the second video frame in relation to the first video frame. The inter-encoding S412 is preferably made using any suitable inter encoding method, such as H.263, H.264 or H.265.

The method 400 may further comprise determining a region of interest in the second video frame. In such case, a different probability function may be used for determining S406 the probability for suppressing the difference for frame portions within the region of interest as compared with a probability function used for determining S406 the probability for suppressing the difference for frame portions outside the region of interest.

The method may further comprise, for each frame portion of the second video frame, receiving information whether a difference between the corresponding frame portion of the first video frame and a corresponding frame portion of a video frame preceding the first video frame in the video sequence was suppressed. If the difference between the corresponding frame portion of the first video frame and the corresponding frame portion of the video frame preceding the first video frame was suppressed, the method may further comprise decreasing the probability for suppressing the difference of the frame portion of the second video frame. An amount of the decrease in the probability may be set in different ways. For example, the amount of the decrease in the probability may be predetermined, e.g. a 10% decrease in the probability. Alternatively, the amount of the decrease in the probability may depend on a difference between the corresponding frame portion of the first video frame and the corresponding frame portion of the video frame preceding the first video frame in the video sequence. For example, the amount of the decrease in the probability may increase with an increasing size of the difference between the frame portion of the first video frame and the corresponding frame portion of the video frame preceding the first video frame in the video sequence.

The person skilled in the art realizes that the present teachings are by no means is limited to the preferred embodiments described above. On the contrary, many modifications and variations are possible within the scope of the appended claims.

For example, in addition to the above-mentioned processing modules the video processing pipeline 120 may comprise one or more additional processing modules. The one or more additional processing modules may be one or more of the following: an image sensor correction module, a noise reduction module, a frame scaling module, a gamma correction module, an image enhancement module, a color space conversion module, an exposure merge module (e.g. WDR/HDR) and a chroma subsampling module.

Additionally, variations to the disclosed embodiments can be understood and effected by the skilled person in practicing the claims, from a study of the drawings, the disclosure, and the appended claims.

The invention claimed is:

1. A method of inter-coding a second video frame of a video sequence in relation to a first video frame, the method comprising:
   dividing the first and second video frames into frame portions;
   for each frame portion of the second video frame:
      determining a difference between video data of the frame portion of the second video frame and video data of a corresponding frame portion of the first video frame,
      determining a probability for suppressing the difference, wherein the probability is determined according to a probability function that decreases with an increasing size of the difference, wherein the probability function gives a probability between 0 and 1 for each value of a size of the difference between video data of a frame portion of the second video frame and video data of a corresponding frame portion of the first video frame, deciding whether to suppress the difference or not by generating a random number between 0 and 1 and comparing it to the determined probability, suppressing the difference in case it is decided to suppress the difference, and inter-encoding the frame portion of the second video frame in relation to the first video frame.

2. The method according to claim 1, wherein suppressing the difference for a frame portion of the second video frame comprises setting video data of the frame portion of the second video frame to be equal to video data of the corresponding frame portion of the first video frame.

3. The method according to claim 1, wherein suppressing the difference for a frame portion of the second video frame comprises ignoring the difference while inter-encoding the frame portion of the second video frame.

4. The method according to claim 1, wherein determining a difference between video data of a frame portion of the second video frame and video data of a corresponding frame portion of the first video frame comprises:

determining a difference between pixel values of the frame portion of the second video frame and pixel values of the corresponding frame portion of the first video frame.

5. The method according to claim 1, wherein determining a difference between video data of a frame portion of the second video frame and video data of a corresponding frame portion of the first video frame comprises:

determining a difference between frequency coefficients of the frame portion of the second video frame and frequency coefficients of the corresponding frame portion of the first video frame.

6. The method according to claim 1, wherein the probability function is a continuous function.

7. The method according to claim 1, wherein the probability function is a linear function.

8. The method according to claim 1, wherein the probability function is a reverse sigmoid function.

9. The method according to claim 1, further comprising determining a region of interest in the second video frame, wherein a probability function used for determining the probability for suppressing the difference for the frame portions within the region of interest is different from a probability function used for determining the probability for suppressing the difference for the frame portions outside the region of interest.

10. The method according to claim 1, further comprising, for each frame portion of the second video frame:

receiving information whether a difference between the corresponding frame portion of the first video frame and a corresponding frame portion of a video frame preceding the first video frame in the video sequence was suppressed, if the difference between the corresponding frame portion of the first video frame and the corresponding frame portion of the video frame preceding the first video frame was suppressed, decreasing the probability for suppressing the difference of the frame portion of the second video frame.

11. A non-transitory computer-readable storage medium having stored thereon instructions for implementing a method of inter-coding a second video frame of a video sequence in relation to a first video frame, when executed on a device having processing capabilities, the method comprising:

dividing the first and second video frames into frame portions;

for each frame portion of the second video frame:

determining a difference between video data of the frame portion of the second video frame and video data of a corresponding frame portion of the first video frame, determining a probability for suppressing the difference, wherein the probability is determined according to a probability function that decreases with an increasing size of the difference, wherein the probability function gives a probability between 0 and 1 for each value of a size of the difference between video data of a frame portion of the second video frame and video data of a corresponding frame portion of the first video frame, deciding whether to suppress the difference or not by generating a random number between 0 and 1 and comparing it to the determined probability, suppressing the difference in case it is decided to suppress the difference, and inter-encoding the frame portion of the second video frame in relation to the first video frame.

12. A video processing pipeline for inter-coding a second video frame of a video sequence in relation to a first video frame, the video processing pipeline comprising:

a video frame partitioning processing module configured to divide the first and second video frames into frame portions;

a change processing module configured to, for each frame portion of the second video frame, determine a difference between video data of the frame portion of the second video frame and video data of a corresponding frame portion of the first video frame;

a probability processing module configured to determine a probability for individually 10 suppressing each of the determined differences, wherein the probability for individually suppressing each of the determined differences is determined according to a probability function that decreases with an increasing size of the difference, wherein the probability function gives a probability between 0 and 1 for each value of a size of the difference between video data of a frame portion of the second video frame and video data of a corresponding frame portion of the first video frame;

a suppress processing module configured to decide whether to suppress each of the determined difference or not by generating a respective random number between 0 and 1 and comparing it to a respective determined probability, and to suppress the difference in case it is decided to suppress the difference; and an encode processing module, arranged downstream the suppress processing module, wherein the encode processing module is configured to inter-encode the frame portions of the second video frame in relation to the first video frame.

13. The video processing pipeline of claim 12, wherein the suppress processing module is configured to suppress the difference by setting video data of the frame portion of the second video frame to be equal to the video data of the corresponding frame portion of the first video frame.

14. The video processing pipeline of claim 12, wherein the suppress processing module is configured to suppress the difference by instructing the encode processing module to ignore the difference while inter-encoding the frame portion of the second video frame.

15. A video camera comprising a video processing pipeline for inter-coding a second video frame of a video sequence in relation to a first video frame, the video processing pipeline comprising:
- a video frame partitioning processing module configured to divide the first and second video frames into frame portions;
- a change processing module configured to, for each frame portion of the second video frame, determine a difference between video data of the frame portion of the second video frame and video data of a corresponding frame portion of the first video frame;
- a probability processing module configured to determine a probability for individually suppressing each of the determined differences, wherein the probability for individually suppressing each of the determined differences is determined according to a probability function that decreases with an increasing size of the difference, wherein the probability function gives a probability between 0 and 1 for each value of a size of the difference between video data of a frame portion of the second video frame and video data of a corresponding frame portion of the first video frame;
- a suppress processing module configured to decide whether to suppress each of the determined difference or not by generating a respective random number between 0 and 1 and comparing it to a respective determined probability, and to suppress the difference in case it is decided to suppress the difference; and
- an encode processing module, arranged downstream the suppress processing module, wherein the encode processing module is configured to inter-encode the frame portions of the second video frame in relation to the first video frame.

* * * * *